Figure 1:
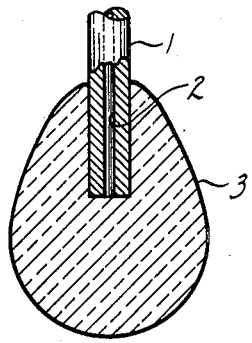

Sept. 7, 1943.   L. POGLEIN   2,329,136
METHOD OF MAKING PRESSED HOLLOW GLASSWARE
Filed Nov. 18, 1941   2 Sheets-Sheet 1

INVENTOR.
Louis Poglein
William B Jaspert
BY Attorney.

Sept. 7, 1943.  L. POGLEIN  2,329,136
METHOD OF MAKING PRESSED HOLLOW GLASSWARE
Filed Nov. 18, 1941  2 Sheets-Sheet 2

INVENTOR.
Louis Poglein
William B Jaspert
BY  attorney.

Patented Sept. 7, 1943

2,329,136

UNITED STATES PATENT OFFICE 2,329,136

METHOD OF MAKING PRESSED HOLLOW GLASSWARE

Louis Poglein, Jeannette, Pa., assignor to McKee Glass Company, Jeannette, Pa., a corporation of Pennsylvania Application November 18, 1941, Serial No. 419,580

5 Claims. (Cl. 49—83)

This invention relates to the method of making hollow articles of glass or other material while in a plastic state, and it is among the objects thereof to produce such articles by a press mold operation.

Hollow articles of glass as heretofore made employ either a blow, or a press and blow method of conforming the glass to the shape of the mold and maintaining uniform wall thickness. This is accomplished by charging the mold with a gob of glass, and in case of bottles, the neck is pressed and the parison then blown to the walls of the finish mold.

In accordance with the present invention, hollow articles of any desired shape may be produced by a molding operation only, which adapts the method to the making of annular shapes of cylindrical hollow cross-section or other desired configurations.

The invention employs a hollow gob or mold charge containing an excess quantity of glass around which the mold is closed, resulting in a hollow glass body of substantially uniform wall section.

Figure 2:
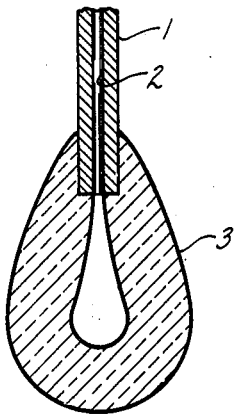
Figure 3:
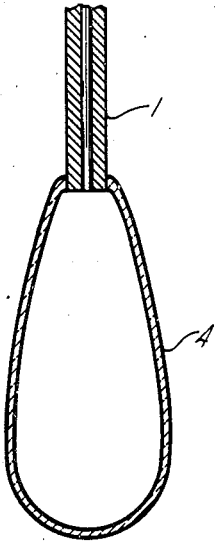
Figure 4:
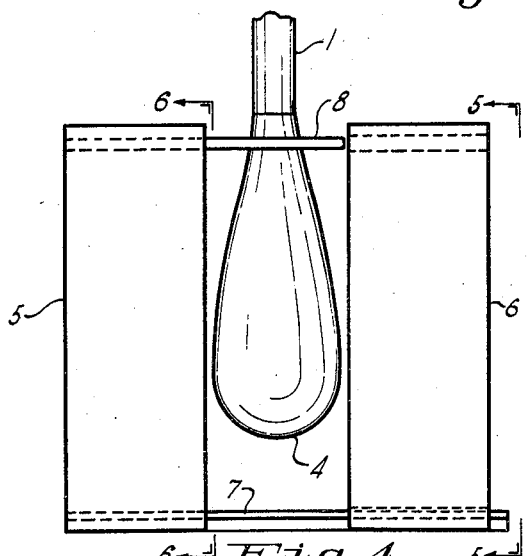
Figure 5:
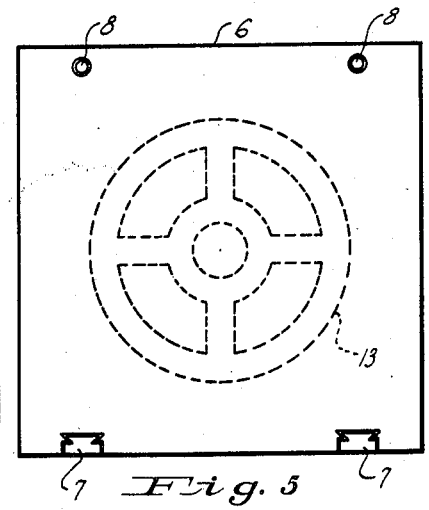
Figure 6:
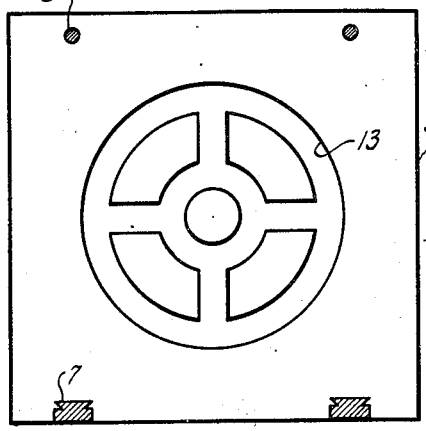
Figure 7:
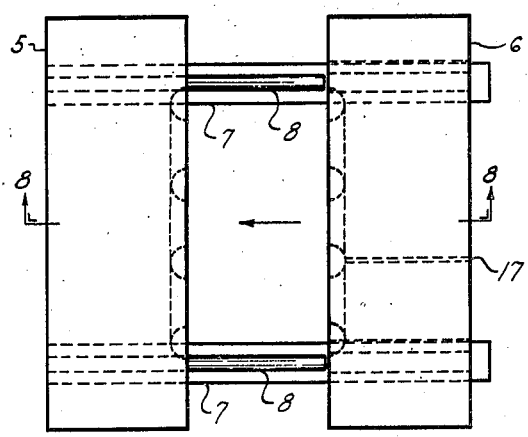
Figure 8:
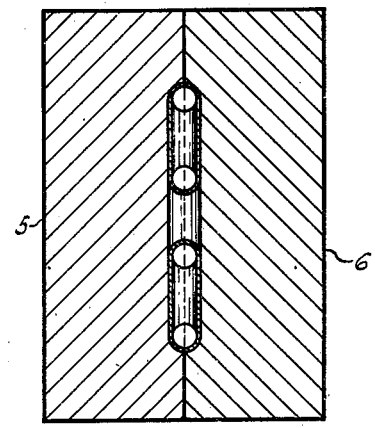
Figure 9:
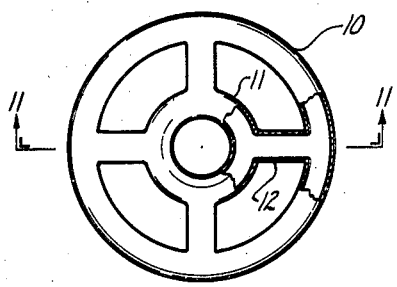
Figure 10:
Figure 11:
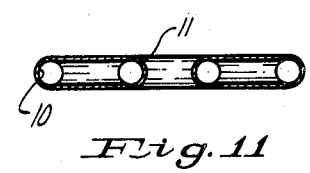

The invention will become more apparent from a consideration of the accompanying drawings constituting a part hereof in which like reference characters designate like parts, and in which:

Fig. 1 is a vertical cross-sectional view of a gob of glass formed on the end of a pontil;

Fig. 2 a similar view with the gob partially expended to form a hollow interior;

Fig. 3 shows the gob expanded to the desired mold charge;

Fig. 4 a front elevational view of a mold and gob in charging position;

Fig. 5 an end elevational view taken on the line 5—5, Fig 4;

Fig. 6 a front elevational view of the inner matrix face of the mold;

Fig. 7 a side elevational view of the mold of Figs. 5 and 6;

Fig. 8 a vertical cross-section taken along the line 8—8 of Fig. 7 showing the mold in closed position with a hollow glass article formed therein;

Fig. 9 a top plan view, partially cut away, of a hollow glass article;

Fig. 10 a side elevational view thereof;

Fig. 11 a cross-sectional view taken along the line 11—11, Fig. 9; and

Figure 12:
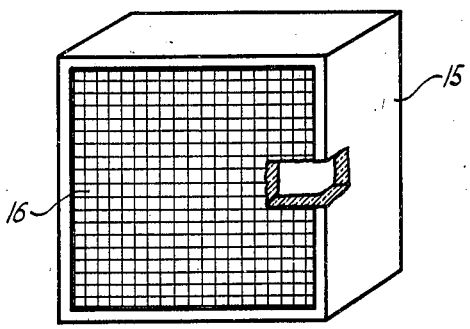

Fig. 12 a view in perspective partially broken away of a hollow glass block.

With reference to Figs. 1 to 11 inclusive of the drawings, the structure therein illustrated comprises a pontil 1, having an air passage 2 which is commonly employed by the workmen to gather the glass 3 on the end thereof, the pontil being inserted through a glory hole of the glass tank and rotated while the glass is being gathered thereon.

In Fig. 2 the gob of glass has been subjected to a puff of air or a gas through the passage 2 and in Fig. 3 it has been blown to the shape which may be termed a parison 4 that is suited to make a hollow glass article of a particular size and weight such as is shown in Fig. 9.

The hollow gob 4 is inserted between the platens 5 and 6 of a metal mold, which are slidably mounted on ways 7, Fig 5, and provided with a guide 8, which may be eliminated, no particular claim being herein made to the construction of the mold.

As shown in Fig. 9, the article is of wheel shape, having a large annulus 10 and a small annulus 11 that are cylindrical, as is more clearly shown in Fig. 11 of the drawings. The outer and inner anuli are connected by arms or spokes 12 that are in open communication to provide a continuous hollow member.

As shown in Figs. 5 and 6, the matrix 13 of the mold is of the shape of the article of Fig. 9, the two matrix sections being identical.

By placing the hollow gob 4 between the matrix sections 5 and 6 of the molds, the gob remaining suspended from the pontil 1, it is ready to receive the molding pressure, wich is applied by closing the platens 5 and 6. The excess glass is sheared off by the closing of the mold which seals the inner chambers of the glass article. The resultant article is that shown in Fig. 9, it being understood that the shape selected is for illustration only and that other forms of hollow articles may thus be produced.

For example, in Fig. 12 a hollow building block of rectangular form designated by the reference character 15 may be formed with indented faces 16 by means of the method described in connection with Figs. 1 to 11.

Because of the high temperature of the glass mass, the air in the gob will be greatly expanded which produces a partial vacuum in the hollow block. This feature is ideal for building purposes as the hollow block will act as a heat insulator.

By means of the invention, glass shapes employing neon gas or fluorescent gases may be produced by a single molding operation, the electrical terminals being inserted in offset portions of the mold to be in proper sealed position in the finished article.

Any excess glass in the hollow gob will be displaced between the faces of the molds in the form of a frangible fin that is readily removed. The mold itself may be ventilated as shown by the numeral 17, Fig. 7, which is a common expedient in glass making.

If the hollow article is to be used as a fluorescent or neon light, a suitable gas in place of air may be used to expand the parison.

Although one embodiment of the invention has been herein illustrated and described, it will be evident to those skilled in the art that various modifications may be made in the details of construction without departing from the principles herein set forth.

I claim:

1. The method of molding hollow articles in a sectional mold, which comprises forming a mold charge of predetermined weight, applying a pressure impulse to the interior of the charge to expand the same to substantially the volume of the mold cavity, placing the charge between movable sections of the mold, severing the charge from the parent body, and closing the mold around the charge to shape the hollow articles against the pressure of the included atmosphere.

2. The method of molding hollow articles in a sectional mold, which comprises forming a mold charge of predetermined weight, applying a pressure impulse to the interior of the charge to expand the same to substantially the volume of the mold cavity, placing the charge between movable sections of the mold, severing the charge from the parent body, and subjecting the exterior of the expanded charge to molding pressure to shape the hollow article against the pressure of the included atmosphere.

3. The method of molding hollow articles in a sectional mold, which comprises forming a mold charge of predetermined weight in suspension between the movable sections of the mold, applying a pressure impulse to the interior of the charge to expand the same to a size and shape appropriate to the mold cavity, severing the charge to seal the included atmosphere, and applying external molding pressure by closing the mold to shape the hollow articles against the internal pressure of the charge.

4. The method of molding hollow articles, which comprises forming a mold charge of a predetermined mass, applying a pressure impulse to the interior of the mass to expand the same to the size and volume appropriate to the mold cavity, placing the charge between the juxtaposed faces of the forming mold, and bringing said faces in abutting relation to seal the charge and shape the hollow article against the pressure of the included atmosphere.

5. The method of molding hollow articles in a sectional mold, which comprises forming a mold charge of predetermined weight in suspension, applying a pressure impulse to the interior of the charge to expand the same and allow it to assume a shape appropriate to the mold cavity, and applying external pressure to the charge to seal and sever the same and to shape the hollow article against the pressure of the included atmosphere.

LOUIS POGLEIN.